US012719982B2

(12) United States Patent
Polak

(10) Patent No.: US 12,719,982 B2
(45) Date of Patent: Aug. 25, 2026

(54) FORECASTING CALL QUALITY USING MACHINE LEARNING TECHNIQUES

(71) Applicant: Dell Products L.P., Round Rock, TX (US)

(72) Inventor: Gabriel Polak, Bratislava (SK)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/423,918

(22) Filed: Jan. 26, 2024

(65) Prior Publication Data

US 2025/0247464 A1 Jul. 31, 2025

(51) Int. Cl.
*H04M 3/22* (2006.01)
*H04L 43/0829* (2022.01)
*H04L 43/087* (2022.01)

(52) U.S. Cl.
CPC ...... *H04M 3/2227* (2013.01); *H04L 43/0829* (2013.01); *H04L 43/087* (2013.01); *H04M 3/2218* (2013.01)

(58) Field of Classification Search
CPC ............. H04M 3/2227; H04M 3/2218; H04M 3/2281; H04M 3/5175; H04M 3/42221; H04M 3/2236; H04M 3/36; H04L 43/0829; H04L 43/087; G06N 20/00
See application file for complete search history.

(56) References Cited

U.S. PATENT DOCUMENTS 8,395,994 B2 * 3/2013 Stevenson ............. H04L 65/752 370/468
8,913,506 B2 * 12/2014 West ..................... H04L 43/087 370/242
9,288,309 B1 * 3/2016 Yeager ................ H04M 3/5175
9,924,404 B1 * 3/2018 Salour ..................... H04L 65/80
9,992,123 B2 * 6/2018 Ouyang .............. H04L 47/2416
(Continued)

OTHER PUBLICATIONS

Wikipedia Contributors, Mean opinion score, https://en.wikipedia.org/w/index.php?title=Mean_opinion_score&oldid=1110257213 (last visited Jan. 26, 2024).
(Continued)

*Primary Examiner* — Akelaw Teshale
(74) *Attorney, Agent, or Firm* — Ryan, Mason & Lewis, LLP

(57) ABSTRACT

Methods, apparatus, and processor-readable storage media for forecasting call quality using machine learning techniques are provided herein. An example computer-implemented method includes obtaining call records for calls corresponding to a first time period, where each of the call records comprises a set of parameter values associated with the corresponding call. The method includes generating, using a first machine learning model, quality scores for the calls based on the corresponding call records, where the quality score for a given call is generated based on the set of parameter values in the corresponding call record. The method also includes generating, using a second machine learning model, a quality score forecast corresponding to a second time period based on the generated quality scores, identifying an issue affecting call quality during the second time period based on the quality score forecast, and initiating an automated action to at least partially remediate the identified issue.

20 Claims, 7 Drawing Sheets

(56) References Cited

U.S. PATENT DOCUMENTS

| | | | | |
|---|---|---|---|---|
| 10,091,348 | B1 * | 10/2018 | Arunachalam | H04L 41/06 |
| 2010/0172251 | A1 * | 7/2010 | Adam | H04L 41/5009 370/252 |
| 2013/0250786 | A1 * | 9/2013 | Balasaygun | H04L 41/5032 370/252 |
| 2016/0028881 | A1 * | 1/2016 | Assem | H04L 47/196 370/252 |
| 2018/0006957 | A1 * | 1/2018 | Ouyang | H04L 65/65 |
| 2020/0022002 | A1 * | 1/2020 | Karanam | G10L 21/0364 |
| 2022/0156667 | A1 * | 5/2022 | Bellenguez | G06Q 10/06375 |
| 2024/0137285 | A1 * | 4/2024 | Lukens | H04L 41/5032 |
| 2024/0235951 | A9 * | 7/2024 | Lukens | H04L 41/5032 |

OTHER PUBLICATIONS

Taylor, Sean J., et al. “Forecasting at Scale.” available at: https://peerj.com/preprints/3190/ (last accessed Jan. 26, 2024) published Sep. 27, 2017.

XGBoost, NVIDIA Corporation, available at: https://www.nvidia.com/en-us/glossary/xgboost/ (last accessed Jan. 26, 2024).

* cited by examiner

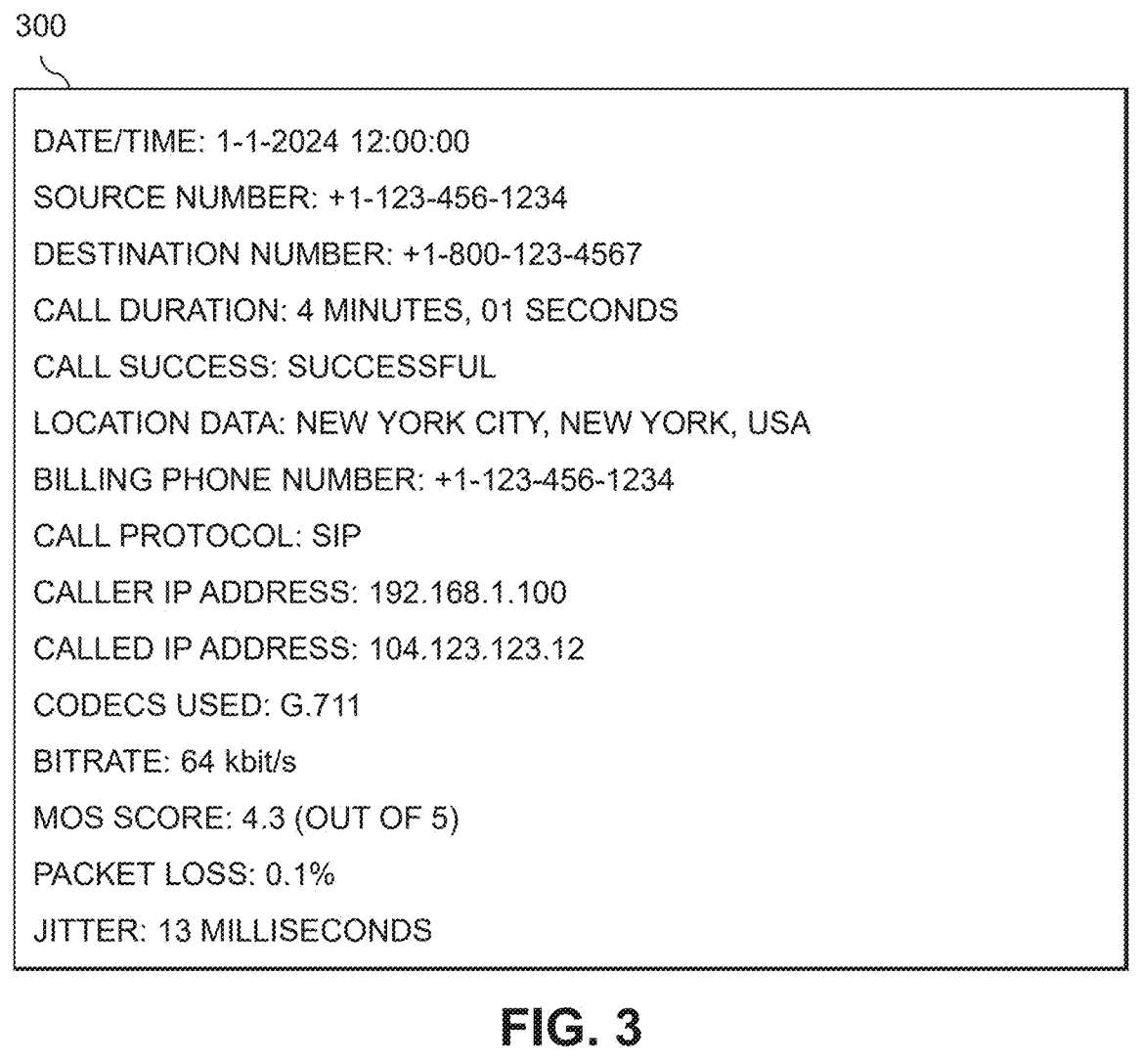

300

DATE/TIME: 1-1-2024 12:00:00
SOURCE NUMBER: +1-123-456-1234
DESTINATION NUMBER: +1-800-123-4567
CALL DURATION: 4 MINUTES, 01 SECONDS
CALL SUCCESS: SUCCESSFUL
LOCATION DATA: NEW YORK CITY, NEW YORK, USA
BILLING PHONE NUMBER: +1-123-456-1234
CALL PROTOCOL: SIP
CALLER IP ADDRESS: 192.168.1.100
CALLED IP ADDRESS: 104.123.123.12
CODECS USED: G.711
BITRATE: 64 kbit/s
MOS SCORE: 4.3 (OUT OF 5)
PACKET LOSS: 0.1%
JITTER: 13 MILLISECONDS

FIG. 3

FORECASTING CALL QUALITY USING MACHINE LEARNING TECHNIQUES

BACKGROUND

Calls are often used by organizations to foster internal collaboration and external communication. Call quality is a significant factor for effective communication. Therefore, it is desirable to address issues that cause poor call quality.

SUMMARY

Illustrative embodiments of the disclosure provide techniques for forecasting call quality using machine learning techniques. An exemplary computer-implemented method includes obtaining one or more call records for one or more calls corresponding to a first time period, where the one or more call records include respective sets of parameter values associated with the corresponding call, and where the one or more calls are implemented using at least one hardware-based communication device. The method includes generating, using a first machine learning model, quality scores for the one or more calls based at least in part on the one or more corresponding call records, where the quality score for a given one of the one or more calls is generated based on at least a portion of the set of parameter values in the corresponding call record. The method also includes generating, using a second machine learning model, a quality score forecast corresponding to a second time period based at least in part on the generated quality scores, identifying at least one issue affecting a call quality during at least a portion of the second time period based at least in part on the quality score forecast, and initiating one or more automated actions to at least partially address the identified at least one issue.

Illustrative embodiments can provide significant advantages relative to conventional techniques. For example, technical problems associated with measuring call quality and addressing issues related to call quality are mitigated in one or more embodiments by implementing a machine learning framework that can effectively forecast call quality by using data extracted from call records.

These and other illustrative embodiments described herein include, without limitation, methods, apparatus, systems, and computer program products comprising processor-readable storage media.

BRIEF DESCRIPTION OF THE DRAWINGS

FIG. 3 shows an example of a call detail record in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Call quality can have a substantial impact on the effectiveness and efficiency of transmitting and receiving voice data. The mean opinion score (MOS) is one performance metric that is often used to measure the quality of a call. The MOS is a subjective rating that involves humans rating call quality on a scale of 1 (e.g., being the worst) to 5 (e.g., being the best). Other performance metrics related to call quality include latency (a value indicating a delay in transmission), packet loss (a value indicating a loss of data during transmission), jitter (a value indicating a variation in the arrival time of packets), and echo (a value indicating a reflection of an original signal), for example.

Measuring MOS provides an effective way to identify how a communication network is being affected so that issues impacting call quality can be addressed. However, actions for mitigating call quality issues are generally performed reactively following the quality scores being collected and analyzed.

One or more exemplary embodiments described herein can generate forecasts of call quality using machine learning techniques to proactively identify one or more network issues. In some embodiments, one or more automated actions for at least partially mitigating the network issues can be performed based on the generated forecasts.

Some embodiments are described herein with reference to voice calls. It is to be appreciated, however, that these and other embodiments are also applicable to other types of non-linear data associated with other types of random events, such as video or messaging technologies. The term "call quality" in this context and elsewhere herein is intended to be broadly construed so as to encompass, for example, a measure of quality of non-linear data associated with random events, including voice call quality and/or video call quality.

Figure 1:
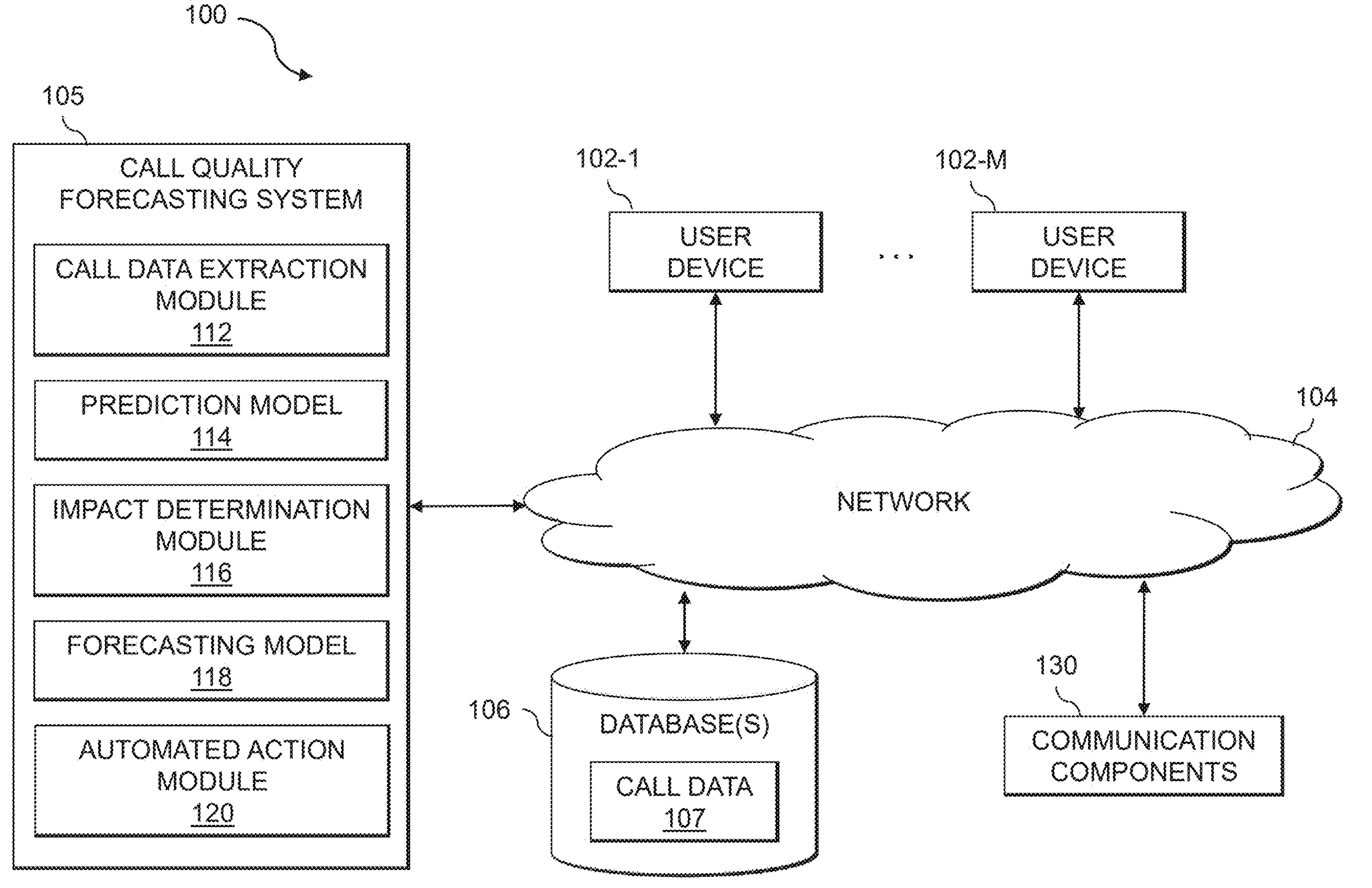
FIG. 1 shows an information processing system configured for forecasting call quality using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a call quality forecasting system 105 and one or more communication components 130.

The user devices 102 may comprise, for example, mobile telephones, laptop computers, tablet computers, desktop computers, communications devices (e.g., fax machines and IP-enabled telephones), or other types of computing devices. Such devices are examples of what are more generally referred to herein as "processing devices." Some of these processing devices are also generally referred to herein as "computers." At least some of the user devices 102 can comprise endpoint devices in a communications network. For example, a given endpoint device can include a phone and/or a voice application that is capable of communicating (e.g., sending and/or receiving voice packets) over an internet protocol (IP) network, such as a Voice over IP (VOIP) network.

At least a portion of the user devices 102 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software, or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The communication components 130, in some embodiments, can correspond to one or more service providers (e.g., VoIP providers) and/or one or more telecommunications networks (e.g., public switched telephone networks). As non-limiting examples, the communication components 130 can include voice routers, switches, session border controllers (SBCs), and/or gateways for connecting to the telecommunications network and/or a network of the VoIP provider. At least some of the communication components 130 may be part of the network 104 in some embodiments.

The term "call" as used herein is intended to be broadly construed so as to encompass, for example, voice calls, video calls, and/or other types of calls that utilize one or more of the networks described herein, including data networks, VoIP networks, public communications network, private communication networks, as non-limiting examples. Additionally, the call quality forecasting system 105 can have one or more associated databases 106 configured to store call data 107 comprising, for example, information related to one or more calls. For example, the call data 107 can comprise call data records (CDRs) corresponding to calls associated with one or more of the user devices 102. In some embodiments, at least some of the communication components 130 can comprise tools for collecting call data 107, such as a CDR collection tool.

An example database 106, such as depicted in the present embodiment, can be implemented using one or more storage systems associated with the call quality forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the call quality forecasting system 105 are one or more input-output devices, which illustratively comprise keyboards, displays or other types of input-output devices in any combination. Such input-output devices can be used, for example, to support one or more user interfaces to the call quality forecasting system 105, as well as to support communication between call quality forecasting system 105 and other related systems and devices not explicitly shown.

Additionally, the call quality forecasting system 105 in the FIG. 1 embodiment is assumed to be implemented using at least one processing device. Each such processing device generally comprises at least one processor and an associated memory, and implements one or more functional modules for controlling certain features of the call quality forecasting system 105.

More particularly, the call quality forecasting system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the call quality forecasting system 105 to communicate over the network 104 with the user devices 102, and illustratively comprises one or more conventional transceivers.

The call quality forecasting system 105 further comprises a call data extraction module 112, a prediction model 114, an impact determination module 116, a forecasting model 118, and an automated action module 120.

Generally, the call data extraction module 112 extracts data (e.g., call data 107) comprising information about a plurality of calls. In some embodiments, the call data extraction module 112 can preprocess and/or transform the extracted data, as discussed in more detail elsewhere herein. The preprocessed data can be provided as input to the prediction model 114 (sometimes referred to herein as a first machine learning model), which generates a predicted call quality score for the data, as discussed further below.

The impact determination module 116 can determine an impact of one or more features (or parameters), corresponding to the extracted data, on the results of the prediction model 114.

The predicted quality scores from the prediction model 114 can be provided as input to the forecasting model 118 (sometimes referred to herein as a second machine learning model), which generates forecasts of the quality scores over one or more periods of time. In some embodiments, an interactive dashboard can be provided to one or more users for visualizing information corresponding to the forecasts. Alternatively, or additionally, the generated forecasts can be used to automatically detect issues with call quality over at least one particular period of time, and then perform one or more actions to proactively address such issues.

It is to be appreciated that this particular arrangement of elements 112, 114, 116, 118, and 120 illustrated in the call quality forecasting system 105 of the FIG. 1 embodiment is presented by way of example only, and alternative arrangements can be used in other embodiments. For example, the functionality associated with the elements 112, 114, 116, 118, and 120 in other embodiments can be combined into a single module, or separated across a larger number of modules. As another example, multiple distinct processors can be used to implement different ones of the elements 112, 114, 116, 118, and 120 or portions thereof.

At least portions of elements 112, 114, 116, 118, and 120 may be implemented at least in part in the form of software that is stored in memory and executed by a processor.

It is to be understood that the particular set of elements shown in FIG. 1 for call quality forecasting system 105 involving user devices 102 of computer network 100 is presented by way of illustrative example only, and in other embodiments additional or alternative elements may be used. Thus, another embodiment includes additional or alternative systems, devices, and other network entities, as well as different arrangements of modules and other components. For example, in at least one embodiment, one or more of the call quality forecasting system 105 and database(s) 106 can be on and/or part of the same processing platform.

An exemplary process utilizing elements 112, 114, 116, 118, and 120 of an example call quality forecasting system 105 in computer network 100 will be described in more detail with reference to, for example, the flow diagram of FIG. 5.

Figure 2:
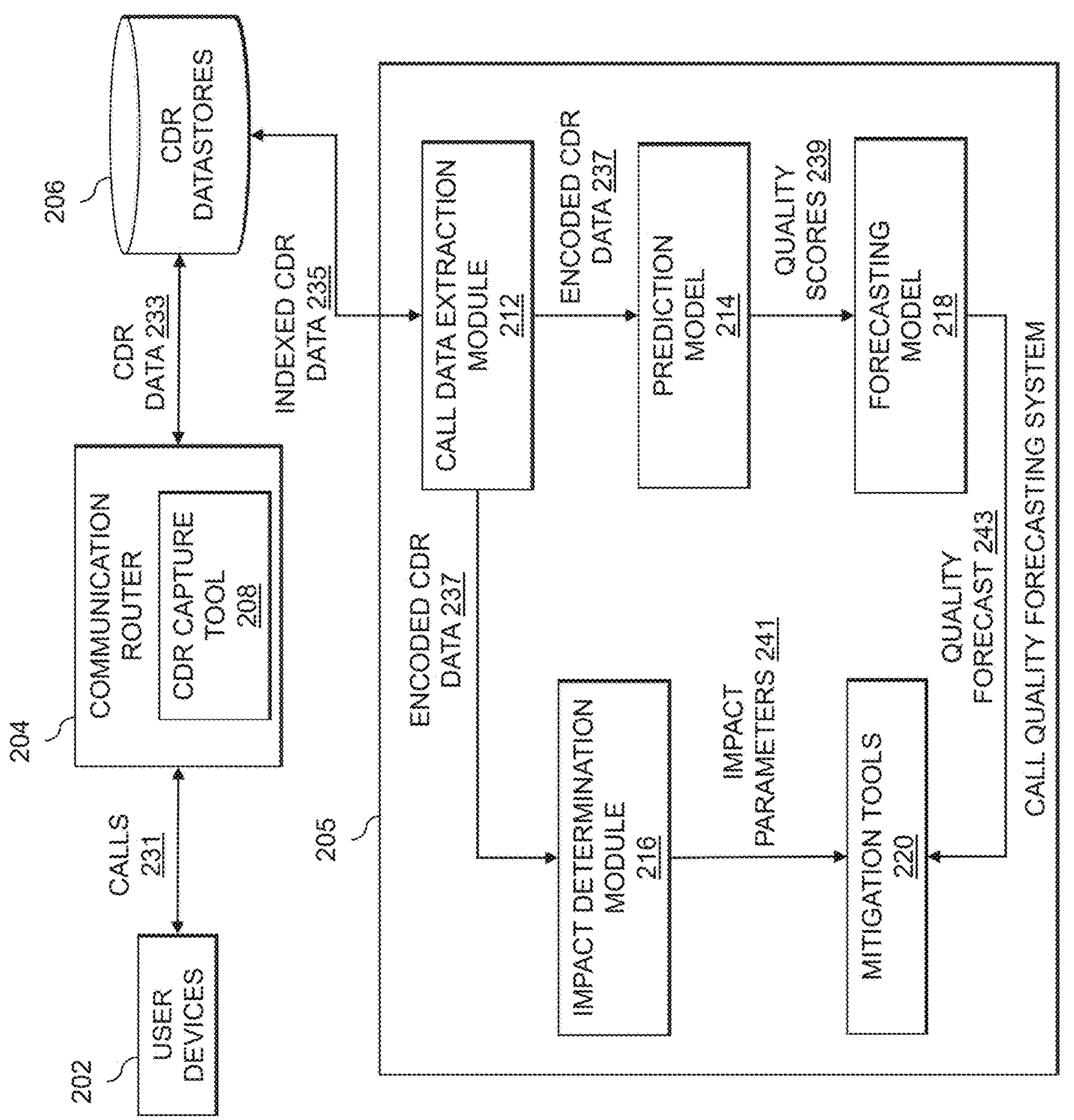
FIG. 2 shows a machine learning framework for forecasting call quality in an illustrative embodiment.

FIG. 2 shows a machine learning-based framework for forecasting call quality in an illustrative embodiment. The machine learning-based framework includes one or more user devices 202, a communication router 204 comprising a CDR capture tool 208, and a call quality forecasting system 205 (e.g., corresponding to the call quality forecasting system 105). The user devices 202 include functionality for making calls 231 via communication router 204. The calls may be between the user devices 202 or between the user device 202 and other communication devices, such as devices corresponding to other telecommunications networks.

The CDR capture tool 208 can comprise functionality for capturing details corresponding to the calls 231 and storing the captured details as CDR data 233 in one or more CDR datastores 206.

Referring also to FIG. 3, this figure shows an example of a CDR 300 in an illustrative embodiment. In this example, the CDR 300 includes values for the following parameters of a call: date/time, source number, destination number, call duration, call success status (e.g., whether the call connected successfully or if there were any errors connecting), location data, billing phone number, call protocol, caller IP address, called IP address, CODECs (coder/decoders) used in the call, bitrate, MOS score, packet loss, and jitter.

It is to be appreciated that the CDR 300 shown in FIG. 3 shows just one example of a CDR, and other CDRs can be used in other embodiments. For example, the CDR 300 may include different and/or additional call details such as details related to the communication path corresponding to the call, including information related to ingress, egress, and/or traversing devices, for example.

The CDR datastores 206 can store and index CDRs (such as CDR 300) as indexed CDR data 235, and the indexed CDR data 235 can be retrieved by a call data extraction module 212 of the call quality forecasting system 205. In some embodiments, the call data extraction module 212 can retrieve a subset of the indexed CDR data 235, such as CDRs having at least one calculated performance metric (e.g., an MOS score over zero) and having a particular session initiation protocol (SIP) status (e.g., records having an SIP code value of "200" indicating a successfully connected call). This can help ensure that the indexed CDR data 235 corresponds to calls that were completed and includes at least one calculated performance metric. By way of example, the call data extraction module 212 can generate a query for retrieving the indexed CDR data 235 over a particular period of time using an open database connectivity interface. The indexed CDR data 235 can be structured in a multi-dimensional array format, such as a pandas data frame.

The call data extraction module 212 can optionally preprocess the indexed CDR data 235. The preprocessing can include converting the indexed CDR data 235 into a common format that can be ingested by a prediction model 214, and possibly remove parts of the CDR data 233 that are not relevant to call quality. The preprocessing can include removing metadata added by the CDR capture tool 208, such as network tags, SBC hostnames, and trunk configured names, as non-limiting examples.

Additionally, IP addresses in the indexed CDR data 235 can be converted into a unified set of network tags. This can help avoid network tag mismatches that might be present in the indexed CDR data 235 (e.g., resulting from different formats and/or CDR capture tools being used). For example, the network tags can identify specific networks, such as one or more private telecommunication networks, one or more public switched telephone networks, one or more hosted VoIP networks, and/or one or more other types of communication networks.

Empty fields (e.g., fields having a NULL value) can also be removed from the indexed CDR data 235. According to at least one embodiment, the fields in the indexed CDR data 235 can be categorized, and the data can be encoded based on the categories (e.g., each string in a category can be represented by a respective number). The resulting encoded CDR data 237 can be provided to the prediction model 214 (sometimes referred to herein as a first machine learning model) that generates predicted quality scores 239. For example, the encoded CDR data 237 can be divided into a training dataset and a test dataset. In some embodiments, the first machine learning model can be implemented as a gradient-boosted decision tree model. It is to be appreciated, however, that first machine learning model can be implemented as another type of machine learning model, including a random forest model, a regression-based model, and/or a support vector machine (SVM) model, as non-limiting examples.

In some embodiments, the call quality forecasting system 205 can perform a tuning process to identify a set of parameters to be used. For example, the tuning process can include performing a grid search to identify a combination of hyperparameters that can be used to improve the performance of the prediction model 214. If the tuning process has already been performed, then the tuning process can be skipped, and the prediction model 214 can be loaded with hyperparameters determined from a previous execution of the tuning process, for example. In some embodiments, the grid search can be repeated (e.g., periodically) when new CDR data is available.

The tuning process, in some embodiments, can include specifying a range of values for each hyperparameter that is to be optimized in order to define a grid of possible combinations. The prediction model 214 can then be trained using the training dataset with each combination of hyperparameters. The performance of the prediction model 214 can be evaluated using the test dataset (e.g., based on accuracy) for each combination. A given one of the combinations of hyperparameters can be selected based on the performance of the prediction model 214. Accordingly, in some embodiments, the prediction model 214 can be trained to generate a performance score based on the CDR of a given call.

According to some embodiments, the encoded CDR data 237 can also be provided to an impact determination module 216. The impact determination module 216 can analyze the impact different parameters have on the prediction model 214. For example, the impact determination module 216 can identify a designated number of parameters that have the highest impact on the results of the prediction model 214. In some embodiments, the impact determination module 216 can generate a plot or visualization of the impacts using Shapley Additive Explanations (SHAP) values, for example.

Figure 4:
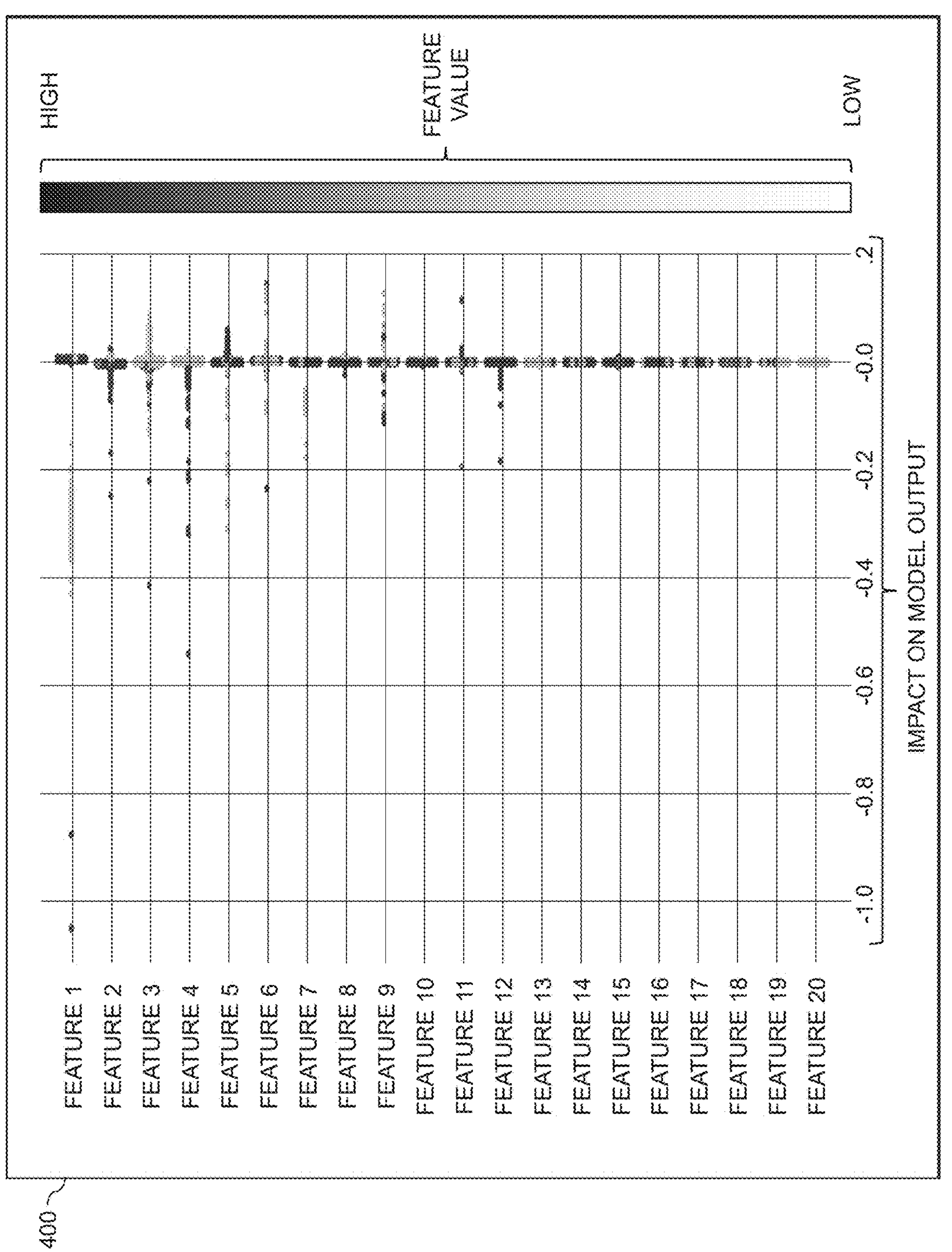
FIG. 4 shows a visual representation of a parameter impact analysis in an illustrative embodiment.

Referring also to FIG. 4, this figure shows an example of a plot 400 showing SHAP values for different parameters or features (labeled features 1-20). The impact on the model is shown along the x-axis of the plot 400, and the feature values are indicated using different shades. In this example, the features 1-20 can correspond to different CDR fields, such as CODECs, IP addresses, call times, location data, etc. It is noted that feature 1 is considered the most impactful feature in plot 400, and feature 20 is considered the least impactful feature. At least a portion of the parameters or features can be output to one or more mitigation tools 220 as impact parameters 241. Optionally, call records (e.g., CDR data 233) with predicted quality scores 239 below a quality score threshold can be re-analyzed by the impact determination module 216 in order to show the features that are most impactful for calls having inadequate quality.

The predicted quality scores 239 generated by the prediction model 214 can be provided to a forecasting model 218. The forecasting model 218 (sometimes referred to herein as a second machine learning model) generally comprises a time series forecasting model. For example, the forecasting model 218 can be implemented as a regression-based model and/or an autoregression-based model (e.g., a Prophet model). Generally, an autoregression-based model explains a future variable using its past (or lagged) values. By way of example, the forecasting model 218 can obtain the predicted quality scores 239 to generate a quality score forecast over a specified period of time. It is to be appreciated that the second machine learning model can be implemented as another type of machine learning model, including a transformer-based model, a seasonal autoregressive integrated moving-average (SARIMA) model, recurrent neural network (RNN) model, long short-term memory (LSTM) model, and/or other types of machine learning models that can generate forecasts based on time series data.

In some embodiments, the forecasting model 218 can generate a quality score forecast for each network tag. One or more constraints can be applied to the forecasting model 218 in order to improve the forecasts. For example, the forecasting model 218 can be configured to consider seasonality based on the frequency in which the CDR data 233 is retrieved, the locations in which the CDR data 233 is collected, any outliers (e.g., days corresponding to particular holidays), and/or data thresholds to ensure that enough CDR data 233 is available for forecasting a particular network tag. By way of example, the forecast can be set as one quarter of the selected days (e.g., CDR data collected over a period of four days can be used to forecast one day).

The quality forecasts 243 (e.g., quality score forecasts) generated by the forecasting model 218 as well as the impact parameters 241 generated by the impact determination module 216 can be provided to the one or more mitigation tools 220. The one or more mitigation tools 220 can be configured to perform one or more automated actions based on the quality forecasts 243. For example, the one or more automated actions can include updating an interactive dashboard with information corresponding to a number of calls that are predicted to have quality scores below some threshold value. As a non-limiting example, if the predicted quality score 239 corresponds to MOS, then the threshold value can be set to four, or some other number that indicates a call as being poor or inadequate quality. The one or more mitigation tools 220 can alternatively or additionally update an interactive dashboard to include a graph showing a predicted average quality score for calls in different networks, and/or display a comparison between the predicted quality scores 239 and actual quality scores. In some embodiments, the one or more mitigation tools 220 can be configured to generate one or more alerts in response to detecting one or more issues. For example, the network issues may correspond to one or more network components being misconfigured (e.g., a CODEC being misconfigured in a voice router), a predicted increase in traffic, and/or network component issues with particular ports and/or IP addresses. In at least some embodiments, the one or more mitigation tools 220 can perform an automated action to address a network issue (e.g., by automatically reconfiguring one or more network components, restarting one or more components, and/or reallocating resources (e.g., network and/or storage resources), as non-limiting examples.

Figure 5:
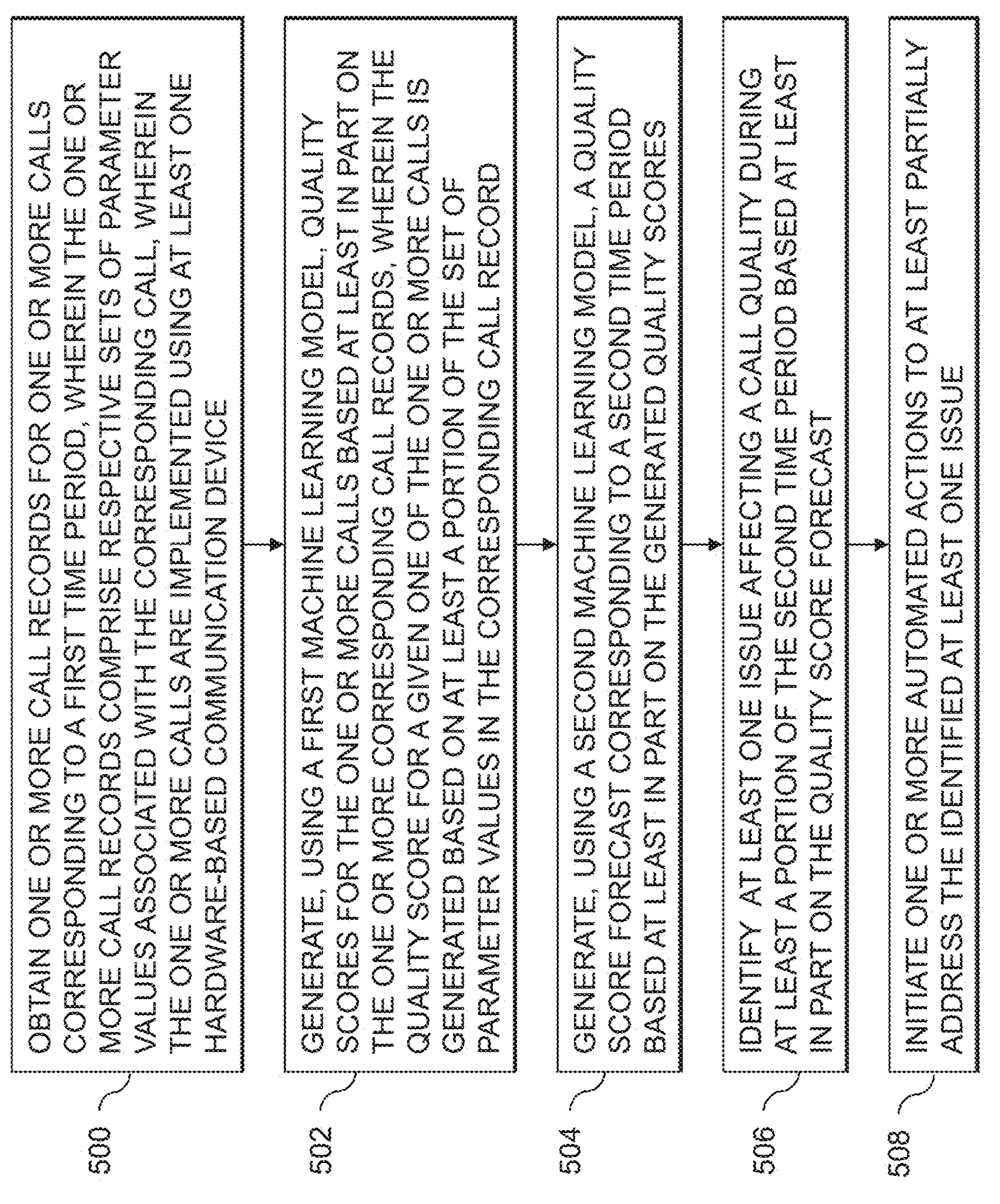
FIG. 5 shows a flow diagram of a process for forecasting call quality using machine learning techniques in an illustrative embodiment.

FIG. 5 is a flow diagram of a process for forecasting call quality using machine learning techniques in an illustrative embodiment. It is to be understood that this particular process is only an example, and additional or alternative processes can be carried out in other embodiments.

In this embodiment, the process includes steps 500 through 508. These steps are assumed to be performed by the call quality forecasting system 105 utilizing its elements 112, 114 and 116.

Step 500 includes obtaining one or more call records for one or more calls corresponding to a first time period, wherein the one or more call records comprise respective sets of parameter values associated with the corresponding call, wherein the one or more calls are implemented using at least one hardware-based communication device.

Step 502 includes generating, using a first machine learning model, quality scores for the one or more calls based at least in part on the one or more corresponding call records, wherein the quality score for a given one of the one or more calls is generated based on at least a portion of the set of parameter values in the corresponding call record.

Step 504 includes generating, using a second machine learning model, a quality score forecast corresponding to a second time period based at least in part on the generated quality scores.

Step 506 includes identifying at least one issue affecting a call quality during at least a portion of the second time period based at least in part on the quality score forecast.

Step 508 includes initiating one or more automated actions to at least partially address the identified at least one issue.

The set of parameter values of a given one of the call records may correspond to at least one of a date of the corresponding call, a time of the corresponding call, a duration of the corresponding call, network information for the corresponding call, and at least one codec applied to the corresponding call. The first machine learning model may comprise a gradient-boosted decision tree model (e.g., an extreme gradient boosting (XGBoost) model), and the second machine learning model may comprise an additive regression model (e.g., a Prophet machine learning model). At least one of the parameter values in the set of parameter values may include at least one network address, and the obtaining comprises assigning a label identifying a network associated with the at least one network address. The identifying the at least one issue may be based at least in part on the assigned label. The process may further include a step of performing an impact analysis to determine an impact of one or more parameters corresponding to the one or more parameter values on the first machine learning model. The identifying the at least one issue may include determining a subset of the one or more call records having quality scores below a threshold quality score, performing an additional impact analysis for the subset of the one or more call records, and identifying the at least one issue based at least in part on a result of the additional impact analysis. The one or more automated actions may include at least one of updating an interactive dashboard based on the generated forecast, wherein the interactive dashboard comprises information corresponding to at least one of a number of calls in the second time period having quality scores that are below a threshold quality score and an average quality score for calls in the second time period; generating one or more alerts comprising information associated with the portion of the second time period; and automatically reconfiguring one or more network components. The quality score may correspond to at least one of a latency parameter, a jitter parameter, a packet loss parameter, an echo parameter, and a mean opinion score.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to identify network issues by forecasting call quality based on data extracted from call records using prediction and forecasting machine learning models. These and other embodiments can effectively overcome problems associated with existing call quality evaluation techniques that generally identify problems affecting a communication network after they have occurred. These and other embodiments can effectively improve the quality of calls in a communications network relative to conventional approaches, for example, by proactively addressing networks issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories, and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionalities within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
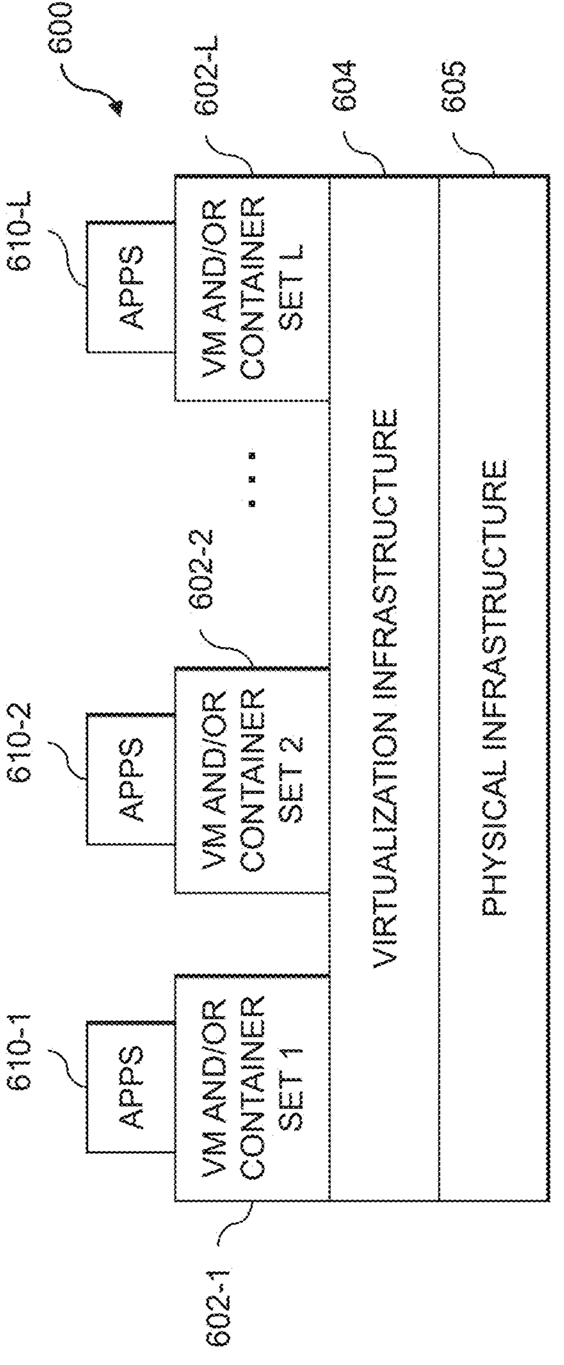
FIGS. 6 and 7 show examples of processing platforms that may be utilized to implement at least a portion of an information processing system in illustrative embodiments.
Figure 7:
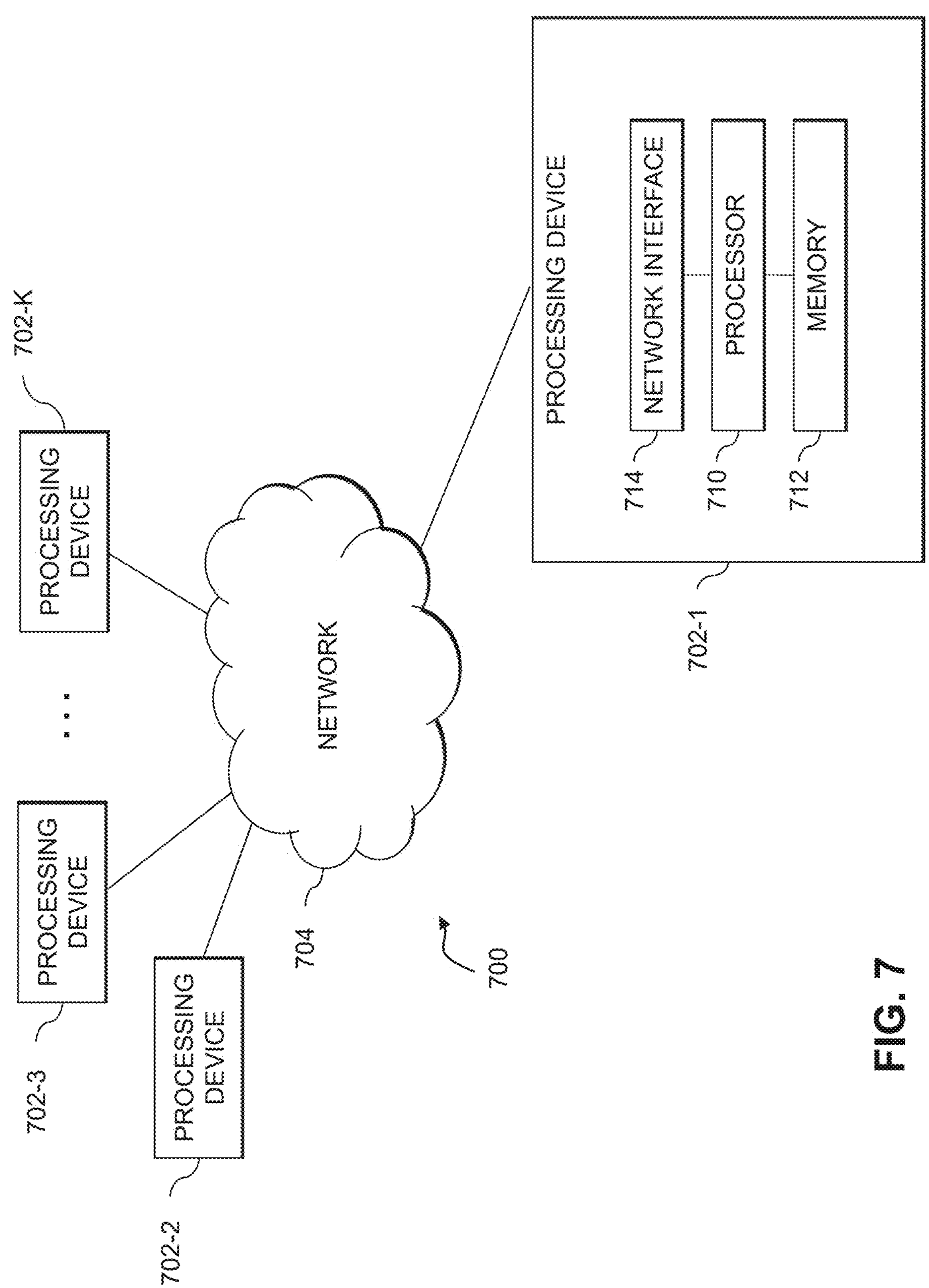

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA, or other type of processing circuitry, as well as portions or combinations of such circuitry elements.

The memory 712 comprises RAM, ROM, or other types of memory, in any combination.

The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk, or an integrated circuit containing RAM, ROM, or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems, and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining a plurality of call records for respective ones of a plurality of calls corresponding to a first time period, wherein the plurality of call records comprise respective sets of parameter values associated with the corresponding call, wherein the plurality of calls is implemented using at least one hardware-based communication device;

generating, using a first machine learning model, quality scores for the plurality of calls based at least in part on the plurality of corresponding call records, wherein the quality score for a given one of the plurality of calls is generated based on at least a portion of the set of parameter values in the corresponding call record;

generating, using a second machine learning model, a quality score forecast corresponding to a second time period based at least in part on a time series of the generated quality scores;

identifying at least one issue affecting a call quality during at least a portion of the second time period based at least in part on the quality score forecast; and initiating one or more automated actions to at least partially address the identified at least one issue;

wherein the method is performed by at least one processing device comprising a processor coupled to a memory.

2. The computer-implemented method of claim 1, wherein the set of parameter values of a given one of the call records corresponds to at least one of:

a date of the corresponding call;

a time of the corresponding call;

a duration of the corresponding call;

network information for the corresponding call; and at least one codec applied to the corresponding call.

3. The computer-implemented method of claim 1, wherein the first machine learning model comprises a gradient-boosted decision tree model and the second machine learning model comprises an additive regression model.

4. The computer-implemented method of claim 1, wherein at least one of the parameter values in the set of parameter values comprises at least one network address, and wherein the obtaining comprises assigning a label identifying a network associated with the at least one network address.

5. The computer-implemented method of claim 4, wherein the identifying the at least one issue is based at least in part on the assigned label.

6. The computer-implemented method of claim 1, further comprising:

performing an impact analysis to determine an impact of one or more parameters corresponding to the set of parameter values on the first machine learning model.

7. The computer-implemented method of claim 6, wherein the identifying the at least one issue comprises:

determining a subset of the plurality of call records having quality scores below a threshold quality score;

performing an additional impact analysis for the subset of the plurality of call records; and identifying the at least one issue based at least in part on a result of the additional impact analysis.

8. The computer-implemented method of claim 1, wherein the one or more automated actions comprise:

generating one or more alerts comprising information associated with the portion of the second time period; and automatically reconfiguring one or more network components.

9. The computer-implemented method of claim 1, wherein the quality score corresponds to at least one of:

a latency parameter;

a jitter parameter;

a packet loss parameter;

an echo parameter; and a mean opinion score.

10. A non-transitory processor-readable storage medium having stored therein program code of one or more software programs, wherein the program code when executed by at least one processing device causes the at least one processing device:

to obtain a plurality of call records for respective ones of a plurality of calls corresponding to a first time period, wherein the plurality of call records comprise respective sets of parameter values associated with the corresponding call, wherein the plurality of calls is implemented using at least one hardware-based communication device;

to generate, using a first machine learning model, quality scores for the plurality of calls based at least in part on the plurality of corresponding call records, wherein the quality score for a given one of the plurality of calls is generated based on at least a portion of the set of parameter values in the corresponding call record;

to generate, using a second machine learning model, a quality score forecast corresponding to a second time period based at least in part on a time series of the generated quality scores;

to identify at least one issue affecting a call quality during at least a portion of the second time period based at least in part on the quality score forecast; and to initiate one or more automated actions to at least partially address the identified at least one issue.

11. The non-transitory processor-readable storage medium of claim 10, wherein the set of parameter values of a given one of the plurality of call records corresponds to at least one of:

a date of the corresponding call;

a time of the corresponding call;

a duration of the corresponding call;

network information for the corresponding call; and at least one codec applied to the corresponding call.

12. The non-transitory processor-readable storage medium of claim 10, the first machine learning model comprises a gradient-boosted decision tree model and the second machine learning model comprises an additive regression model.

13. The non-transitory processor-readable storage medium of claim 10, wherein at least one of the parameter values in the set of parameter values comprises at least one network address, and wherein the obtaining comprises assigning a label identifying a network associated with the at least one network address.

14. The non-transitory processor-readable storage medium of claim 13, wherein the identifying the at least one issue is based at least in part on the assigned label.

15. The non-transitory processor-readable storage medium of claim 10, wherein the program code, when executed by the at least one processing device, further causes the at least one processing device:

to perform an impact analysis to determine an impact of one or more parameters corresponding to the set of parameter values on the first machine learning model.

16. An apparatus comprising:

at least one processing device comprising a processor coupled to a memory;

the at least one processing device being configured:

to obtain a plurality of call records for respective ones of a plurality of calls corresponding to a first time period, wherein the plurality of call records comprise respective sets of parameter values associated with the corresponding call, wherein the plurality of calls is implemented using at least one hardware-based communication device;

to generate, using a first machine learning model, quality scores for the plurality of calls based at least in part on the plurality of corresponding call records, wherein the quality score for a given one of the plurality of calls is generated based on at least a portion of the set of parameter values in the corresponding call record;

to generate, using a second machine learning model, a quality score forecast corresponding to a second time period based at least in part on a time series of the generated quality scores;

to identify at least one issue affecting a call quality during at least a portion of the second time period based at least in part on the quality score forecast; and to initiate one or more automated actions to at least partially address the identified at least one issue.

17. The apparatus of claim 16, wherein the set of parameter values of a given one of the call records corresponds to at least one of:

a date of the corresponding call;

a time of the corresponding call;

a duration of the corresponding call;

network information for the corresponding call; and at least one codec applied to the corresponding call.

18. The apparatus of claim 16, wherein the first machine learning model comprises a gradient-boosted decision tree model and the second machine learning model comprises an additive regression model.

19. The apparatus of claim 16, wherein at least one of the parameter values in the set of parameter values comprises at least one network address, and wherein the obtaining comprises assigning a label identifying a network associated with the at least one network address.

20. The apparatus of claim 19, wherein the identifying the at least one issue is based at least in part on the assigned label.

* * * * *